(12) United States Patent  (10) Patent No.: US 6,709,123 B2
Flohr et al.  (45) Date of Patent: Mar. 23, 2004

(54) DISPLAY DEVICE

(75) Inventors: Heinrich Flohr, Hildesheim (DE); Siegfried Vogt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 09/958,373
(22) PCT Filed: Feb. 5, 2001
(86) PCT No.: PCT/DE01/00459
    § 371 (c)(1), (2), (4) Date: Mar. 25, 2002
(87) PCT Pub. No.: WO01/57434
    PCT Pub. Date: Aug. 9, 2001
(65) Prior Publication Data
    US 2002/0114148 A1 Aug. 22, 2002
(30) Foreign Application Priority Data
    Feb. 4, 2000 (DE) .......... 100 04 972
(51) Int. Cl.[7] .............. F21V 7/04
(52) U.S. Cl. .......... 362/31; 362/558; 362/561; 362/559; 362/555; 362/26; 349/63
(58) Field of Search .......... 385/120; 362/31, 362/555, 558, 551, 561, 559, 330, 26, 27; 349/63

(56) References Cited

U.S. PATENT DOCUMENTS

| | | | |
|---|---|---|---|
| 3,836,809 A | * 9/1974 | Condon | 313/465 |
| 4,344,668 A | * 8/1982 | Gunther et al. | 350/96.27 |
| 4,486,760 A | * 12/1984 | Funada et al. | 346/107 R |
| 5,993,020 A | * 11/1999 | Koike | 362/31 |
| 6,283,602 B1 | * 9/2001 | Kawaguchi et al. | 362/31 |

FOREIGN PATENT DOCUMENTS

| | | | |
|---|---|---|---|
| DE | 86 32 415.2 | 3/1987 | |
| DE | 195 38 893 | 4/1997 | |
| EP | 0 879 991 | 11/1998 | |
| JP | 51-138398 | 5/1975 | |
| JP | 3-235985 | 10/1991 | |
| JP | 10-049064 | 2/1998 | |
| JP | 10300858 A | * 11/1998 | A61B/6/00 |
| JP | 11-133875 | 5/1999 | |
| WO | WO 99 57485 | 11/1999 | |

* cited by examiner

*Primary Examiner*—Stephen Husar
*Assistant Examiner*—Sharon Payne
(74) *Attorney, Agent, or Firm*—Kenyon & Kenyon

(57) ABSTRACT

A display device is described in which a fiber optic plate provided with light scattering particles is used for effective front lighting of a display, for example, a liquid crystal cell. The fiber optic plate is lighted from the side.

28 Claims, 4 Drawing Sheets

DISPLAY DEVICE

FIELD OF THE INVENTION

The present invention relates to a device for front lighting of a flat display.

BACKGROUND INFORMATION

A device for backlighting a flat display is described in German Patent No. 195 38 893. In this device, the light of a light source is injected into a fiber optic plate, diffusion particles being added to the material of the fiber optic plate for diffusion of light. However, in the case of a device for backlighting a display, the backlighting must be operated continuously during observation by a user for the display to be properly readable. To permit operation without backlighting only with daylight, a layer of a reflective material must be arranged behind the display. If the reflective material is arranged in front of the backlighting, it must allow the light from the backlighting to pass through. Therefore, it must be at least partially transparent. This reduces the efficiency in reflection of daylight lighting up the display. Furthermore, it is also known that in order to combine good readability in operation with ambient light on one hand and good readability in backlighting operation of the flat display on the other hand, a fiber optic plate having microprisms must be arranged in front of the flat display. However, to produce a fiber optic plate having microprisms, a mold that is very expensive to manufacture is necessary for production by an injection molding method, for example. In addition, the microprisms must not interfere with readability.

SUMMARY

A device according to the present invention has the advantage that incident light striking the fiber optic plate is deflected to the display by the light scattering particles, thereby lighting up the display. Front lighting of the display is thus possible in a simple and inexpensive manner. This has only a negligible effect on readability in operation with ambient light.

It may be advantageous if the fiber optic plate is at least a part of a front plate of a housing for the flat display. The flat display is thus covered by the fiber optic plate and is therefore protected from contact, soiling and/or destruction. In comparison with a display design having backlighting, this makes it possible to reduce the size of the housing for the flat display, because instead of a flat display for the backlighting and a cover, a fiber optic plate is all that is needed.

Furthermore, it may be advantageous if light of a light source is injected into the fiber optic plate over at least one reflecting surface. Therefore, it is possible for the light source not to be arranged directly next to the fiber optic plate, but instead a position of the light source which is favorable for the design of the entire display device can be selected, and the light emitted by it is injected into the fiber optic plate via the reflective surface.

Furthermore, it may be advantageous to provide a fiber optic wedge in a side face of the fiber optic plate, making it possible to use only a single light source, almost a punctiform light source, for the backlighting.

In addition, it may be advantageous to arrange a light-sensitive electric component on the device, and to measure the ambient brightness by way of the light-sensitive component. The brightness of the lighting of the flat display is regulated as a function of an analysis of the electric current flowing through the light-sensitive component or the voltage drop across the light-sensitive component. This makes it possible for the lighting to be turned off when there is sufficient ambient brightness, thereby reducing the total power consumption of the flat display in comparison with lighting operated continuously. Due to the automatic shutdown, the front lighting cannot inadvertently remain in operation when there is increasing ambient brightness. However, if the ambient brightness decreases, the front lighting is automatically switched on.

In addition, it may be advantageous to arrange a reflector on the side of the display facing away from the fiber optic plate, so that the reflector can deflect light passing through the flat display and reflect it back to an observer. This improves the overall brightness of the display.

In addition, it may be advantageous for the diffusion particles to constitute a maximum of 2% by volume of the total volume of the fiber optic plate. Due to this small amount of diffusion particles, readability of the display is influenced minimally at most.

DETAILED DESCRIPTION

Figure 1:
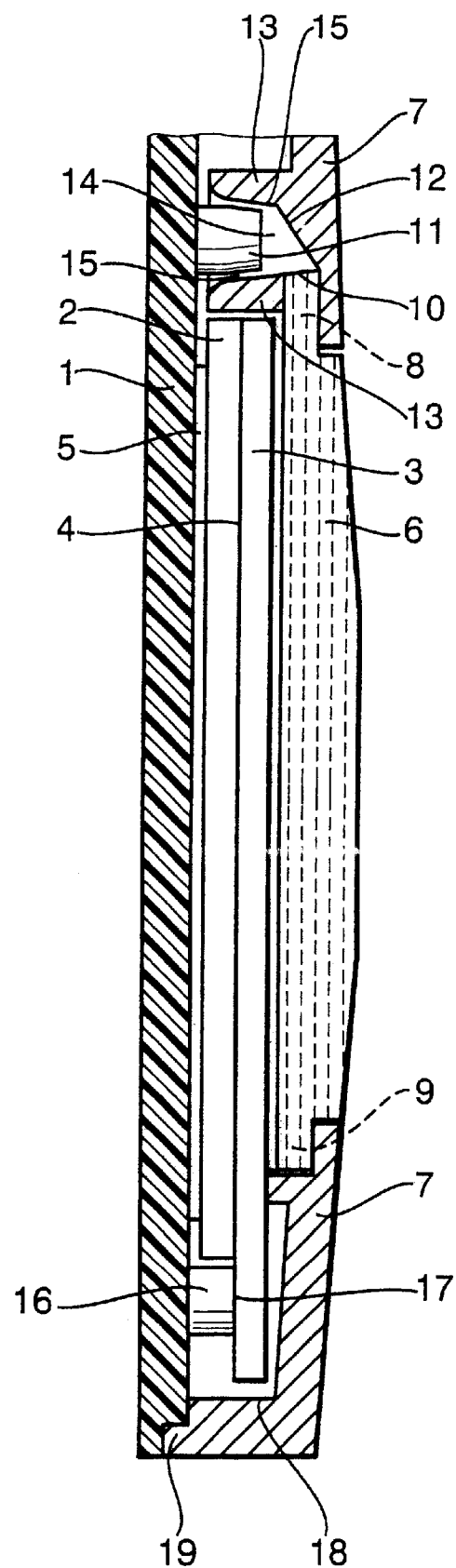
FIG. 1 shows a side view of a first embodiment of a display device according to the present invention.

FIG. 1 shows a cross section of a side view of a display device according to the present invention. FIG. 1 shows a base plate 1 of the display device on which is arranged a flat display designed as a liquid crystal cell. The liquid crystal cell is composed of a first plate 2 and a second plate 3. A liquid crystal layer 4 is arranged between first plate 2 and second plate 3. A reflector 5 is arranged between first plate 2 and base plate 1. Reflector 5, first plate 2 and second plate 3 are arranged in parallel to base plate 1. Base plate 1 is arranged on the side of the liquid crystal cell which faces 15 away from the observer and is formed by a first plate 2, second plate 3, and liquid crystal layer 4. A fiber optic plate 6 is arranged on the side of second plate 3 facing the observer. At its edges, fiber optic plate 6 engages in a housing 7. Fiber optic plate 6 extends with a first extension 8 and a second extension 9 beneath housing 7 in its edge areas. Fiber optic plate 6 ends in the area of first extension 8 with a light injection face 10. Light of a light source 11 arranged on base plate 1 can be injected into a light injection face 10. Housing 7 has a reflective surface 12 on a side facing away from the user, reflecting light emitted by light source 11 in the direction of light injection face 10. Light source 11 is partially surrounded by a ring-shaped border 13 integrally molded onto housing 7. The ring-shaped border forms an opening 14 to accommodate light source 11. Reflective surface 12 and light injection face 10 are in contact with the edge of ring-shaped border 13. The ring-shaped border forms a pot with reflective surface 12 and light injection face 10 arranged on the bottom. A wall 15 of ring-shaped border 13 is preferably covered by a reflective layer. Control contacts 16 are arranged on the side face of first plate 2 opposite light source 11. Electric contact with second plate 3 is established over a contact zone 17. Second plate 3 projects beyond first plate 2 in the area of control contacts 16. In contact with second plate 3, housing 7 forms an edge 18 5 by which housing 7 is connected to base plate 1, preferably by gear teeth 19.

Light source 11 may be connected by a soldered connection to base plate 1, which is designed as a circuit board, for 10 example. No electric terminals of light source 11 are shown in FIG. 1. The light source may be designed as a light emitting diode. In addition, it may also be designed as an incandescent lamp, a glow lamp or a cold cathode fluorescent lamp. The light generated by light source 11 is reflected by reflective 15 surface 12 in the direction of light injection face 10 and is injected into fiber optic plate 6. Reflective surface 12 may be designed as a metal layer applied to the material of housing 7, as a metal film glued to the housing or as a white plastic layer. Light entering fiber optic plate 6 passes through fiber optic plate 6 after being totally reflected on the side faces of fiber optic plate 6. However, diffusion particles are embedded in the fiber optic plate. In an example embodiment, small beads of polycarbonate (PC) are incorporated into the fiber optic device when it is made of polymethyl methacrylate (PMMA) by injection molding, for example. The polycarbonate beads have a diameter in the range of 1 $\mu$m to 6 $\mu$m. Refraction phenomena involving beams of light occur on these incorporated beads due to the difference in the refractive indices of polycarbonate and PMMA. This causes the beams of light to be deflected, preventing total reflection at the surface of fiber optic plate 6. In particular, beams of light are deflected in the direction of the liquid crystal cell, i.e., second plate 3. These beams of light leave fiber optic plate 6, pass through second plate 3, liquid crystal layer 4, and first plate 2. In the process, their optical properties are influenced a first time by liquid crystal layer 4. The beams of light are reflected back by reflector 5 through first plate 2, liquid crystal layer 4, and second plate 3 and are influenced here by liquid crystal layer 4 a second time. They then pass through fiber optic plate 6, and after exiting from fiber optic plate 6, they reach an observer of the display device. This yields lighting operation of the display device with lighting of the liquid crystal cell.

If light source 11 is not in operation, ambient light enters fiber optic plate 6, passing through the liquid crystal cell as described above, being reflected on reflector 5, passing through liquid crystal cell again and reaching a user through fiber optic plate 6. Deflection of light by diffusion particles is not necessary in this case, nor does it happen to any great extent that light passes directly through fiber optic plate 6 and does not travel a potentially great distance through fiber optic plate 6 with total reflection. Housing 7 and base plate 1 are made of an opaque plastic to prevent light losses. Both housing 7 and base plate 1 may be made of plastic. Housing 7 is interlocked with base plate 1. Likewise, the housing also projects partially beyond fiber optic plate 6 on the side facing the observer, so that fiber optic plate 6 is held by housing 7. Control contacts 16 of the liquid crystal cell are represented only symbolically in FIG. 1. Individual contacts and terminals are not shown in detail. First plate 2 and second plate 3 may be made of, for example, glass. A polarizer (not shown in FIG. 1) is arranged on first plate 2 as well as on second plate 3. A homeotropic design of the liquid crystal layer is also possible, making it possible to omit the polarizer. Reflector 5 may be designed as a metal layer or a white plastic layer and is attached either to base plate 1 or to first plate 2, or it may be inserted between base plate 1 and first plate 2.

Figure 2:
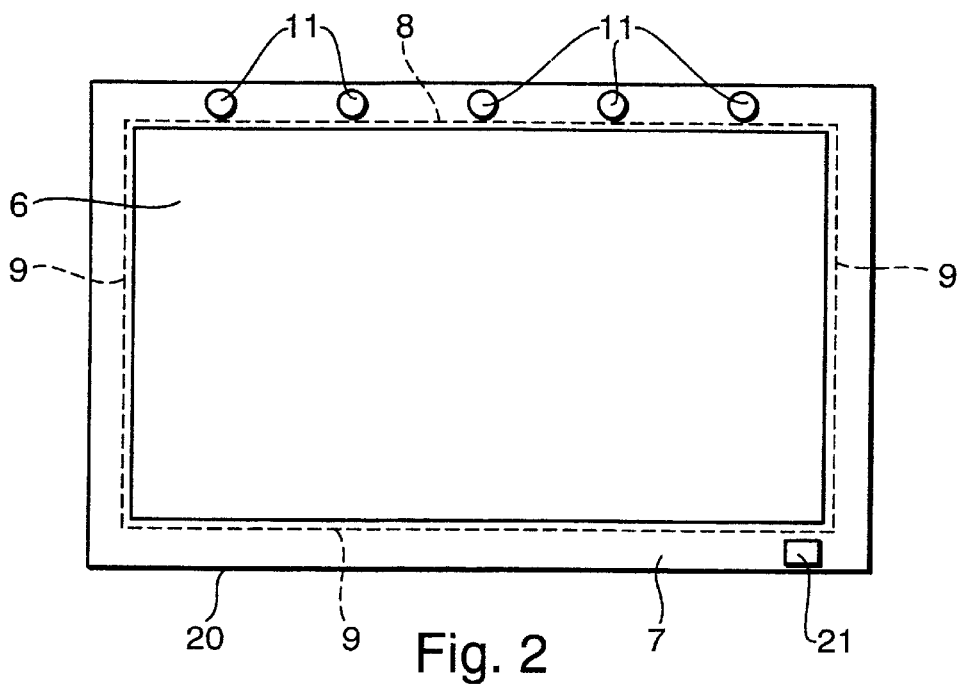
FIG. 2 shows a front view of the display device according to the present invention.

FIG. 2 illustrates a display device 20, where fiber optic plate 6 is framed by housing 7. Here and below, the same reference notation is also used for the same parts. Extensions of fiber optic plate 6, which extend beneath the visible portion of housing 7, are shown with broken lines. The extensions are shown as a first extension 8 on a first side face of fiber optic plate 6. The extensions are shown as a second extension 9 on the other side faces of fiber optic plate 6. Injection of light occurs only on the side face of fiber optic plate 6 having first extension 8.

A plurality of light sources 11, which are arranged on the side face of fiber optic plate 6 where first extension 8 is arranged, are covered by housing 7 with respect to the observer. Light sources 11 are arranged on fiber optic plate 6 in the manner illustrated in FIG. 1. Due to the plurality of light sources 11, more light can be injected into fiber optic plate 6, and homogeneous lighting is also possible. Housing 7 has an opening 21 behind which is arranged a light-sensitive element through which the brightness of the ambient light can be measured. By measuring the light passing through opening 21, it is thus possible for light sources 11 to be activated in the case when ambient light is not sufficient for the display device to be readable.

Figure 3:
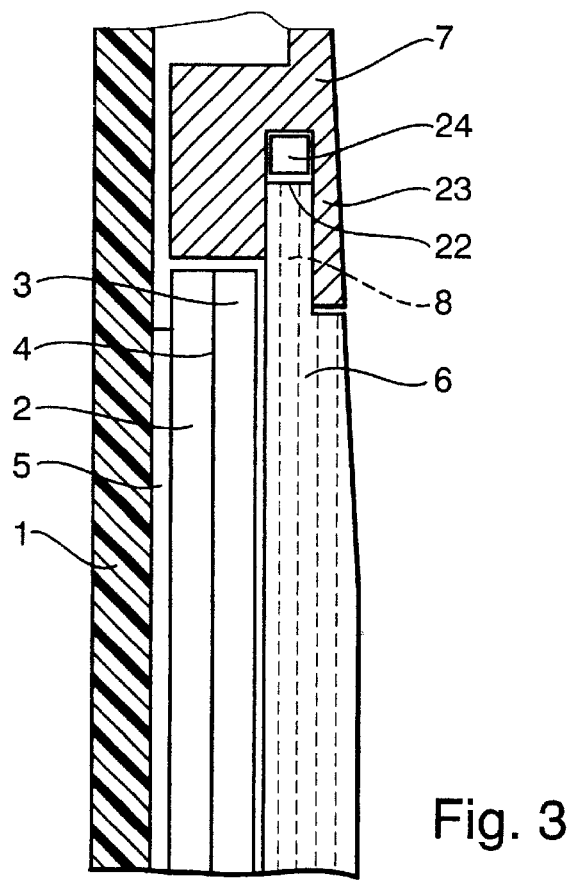
FIG. 3 shows a side view of another embodiment of a display device according to the present invention.

FIG. 3 illustrates another embodiment of light injection into fiber optic plate 6 as shown in FIG. 1. Fiber optic plate 6 has a light injection face 22 into which light of a light source 24 can be injected directly. Light source 24 is arranged in housing 7 and is located directly in front of light injection face 22. An extension 23 of housing 7 covers first extension 8 of fiber optic plate 6 and light source 24, so they are not visible to an observer. Electric power for light source 24 is supplied through lines which run through housing 7 but are not shown in FIG. 3.

Figure 4:
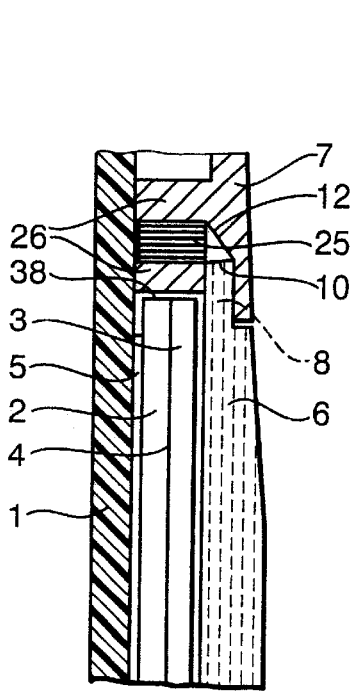
FIGS. 4 and 5 show two different side views of another embodiment according to the present inventio.
Figure 5:
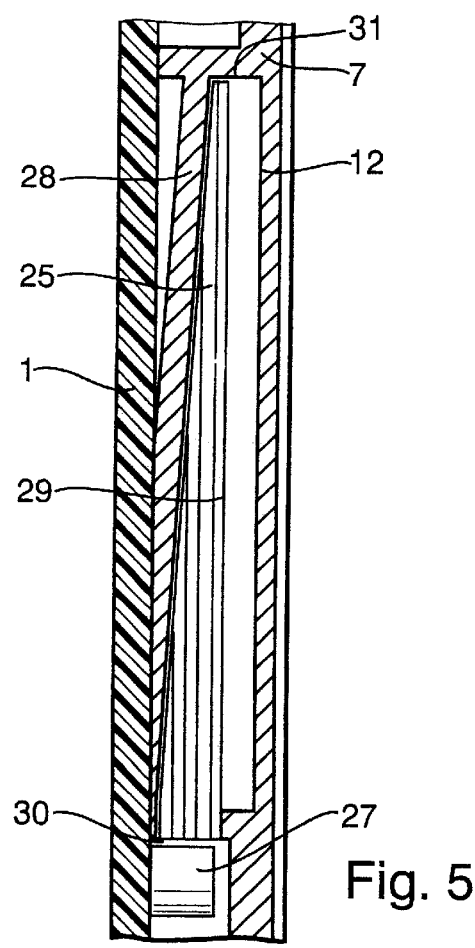

FIG. 4 shows another embodiment of the present invention, where a fiber optic wedge 25 is used instead of light source 11 as described in conjunction with FIG. 1. Fiber optic wedge 25 extends over the length of the liquid crystal cell formed by first plate 2 and second plate 3 and is secured by a first holder 26 formed from housing 7. FIG. 5 shows a longitudinal view of fiber optic wedge 25. Light of a light source 27 is injected into narrow side 30 of fiber optic wedge 25 opposite a wedge edge 31. With total reflection, this light is passed through the fiber optic device, and light is decoupled from a surface 29 of fiber optic wedge 25 by way of microprisms arranged on a surface 29 of the fiber optic wedge or diffusion bodies incorporated into fiber optic wedge 25 similarly to those in fiber optic plate 6, and this light is reflected by reflective surface 12 into light injection face 10 of fiber optic plate 6. Fiber optic wedge 25 is held by a first holder 26 and a second holder 28. This arrangement permits homogeneous lighting of fiber optic plate 6 with a light source 27, designed as an almost punctiform light source, such as a light emitting diode or an incandescent lamp or a glow lamp. In the arrangement illustrated in FIGS. 4 and 5, fiber optic wedge 25 becomes thinner from narrow side 30 to wedge edge 31, fiber optic wedge 25 running parallel to a side face 38 of the liquid crystal cell formed by first plate 2, second plate 3, and liquid crystal layer 4. In another embodiment, it is also possible to design fiber optic wedge 25 as a cube-shaped fiber optic piece. Light can be decoupled here through a printed grid pattern or through a roughened surface, for example.

Figure 6:
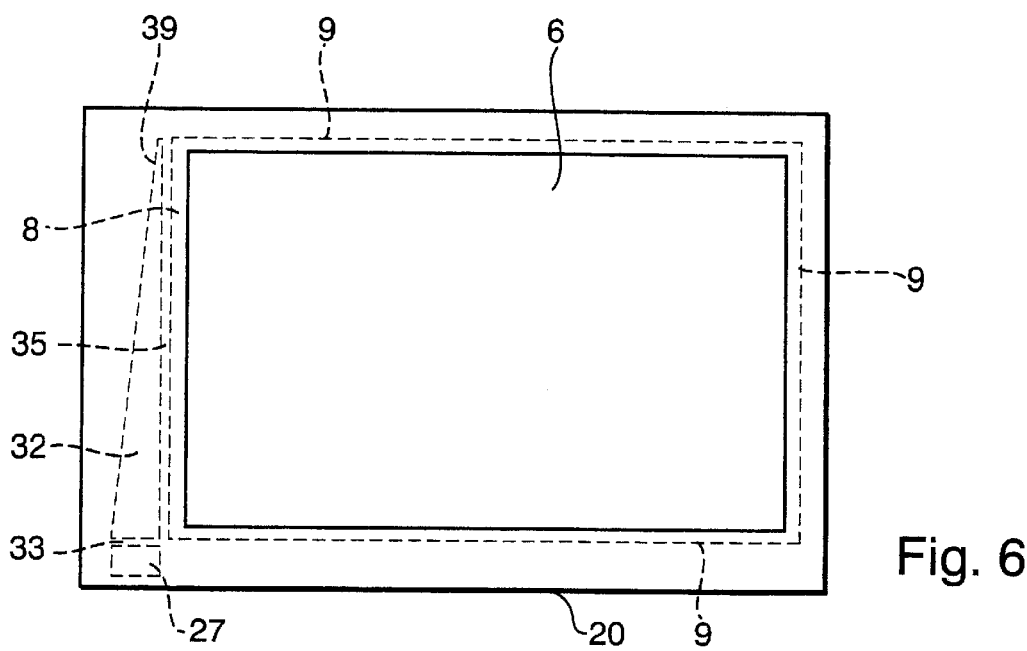
FIGS. 6 and 7 show a front view and a side view of another embodiment.
Figure 7:
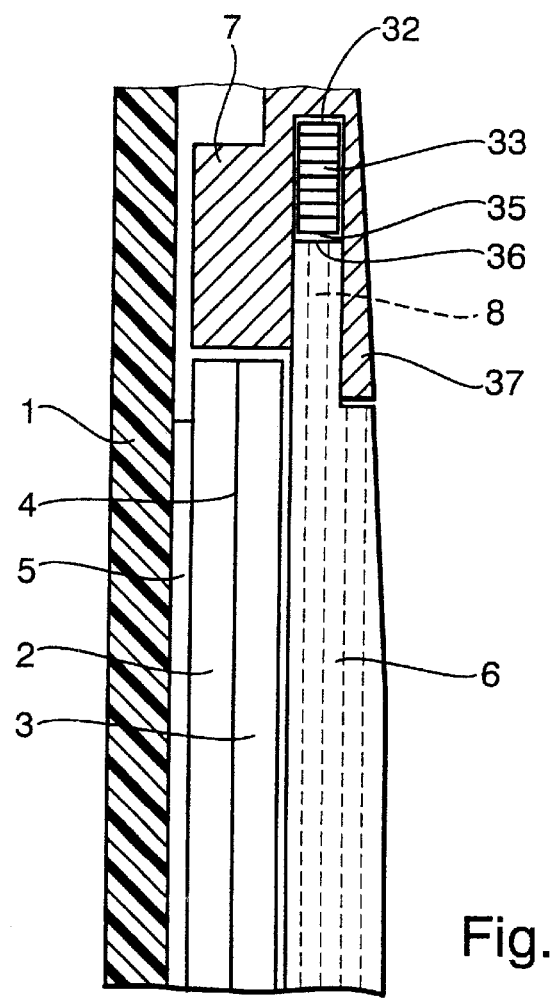

FIG. 6 illustrates another embodiment, showing a front view of a display device 20. A first extension 8 and a second extension 9 are connected to a visible area of fiber optic plate 6 and are shown with broken lines in the figure. A fiber optic wedge 32 is arranged on the side on first extension 8, fiber optic wedge 32 becoming thinner from a narrow side 33 to a wedge edge 34 of fiber optic wedge 32. Fiber optic wedge 32 is arranged next to fiber optic plate 6 in such a manner that fiber optic wedge 32 becomes thinner from narrow side 33 to wedge edge 34 in the plane of fiber optic plate 6. FIG. 7 shows a side view of the device illustrated in FIG. 6 from the direction of light source 27. Narrow side 33 of fiber optic wedge 32 is visible. Light of a light source 27 is injected into fiber optic wedge 32, as in the embodiment illustrated in FIGS. 4 and 5, and is injected through a surface of fiber optic device 35 into a light injection face 36 of fiber optic plate 6 running along a side face of fiber optic plate 6. Fiber optic wedge 32 is accommodated by housing 7 and is not visible to an observer, because an extension 37 of housing 7 covers first extension 8 of fiber optic plate 6 and fiber optic wedge 32. In one embodiment, light source 27 can change the color of the light emitted, so lighting in different colors is possible. The embodiments illustrated in FIGS. 6 and 7 can be modified, for example, by arranging a second fiber optic wedge having a light source on the side face opposite fiber optic wedge 32. This light source may have a different color, so that it is possible to switch the color of the display by selecting the light sources or by operating both light sources at the same time. Furthermore, fiber optic wedge 32 may also be designed in a half-length version, in which case the wedge edge of a second fiber optic wedge is in contact with fiber optic wedge 32. A light source which is also attached to the narrow side of the second fiber optic wedge is arranged on the housing border opposite the first light source. Lighting with two light sources is also possible with this arrangement.

Figure 8:
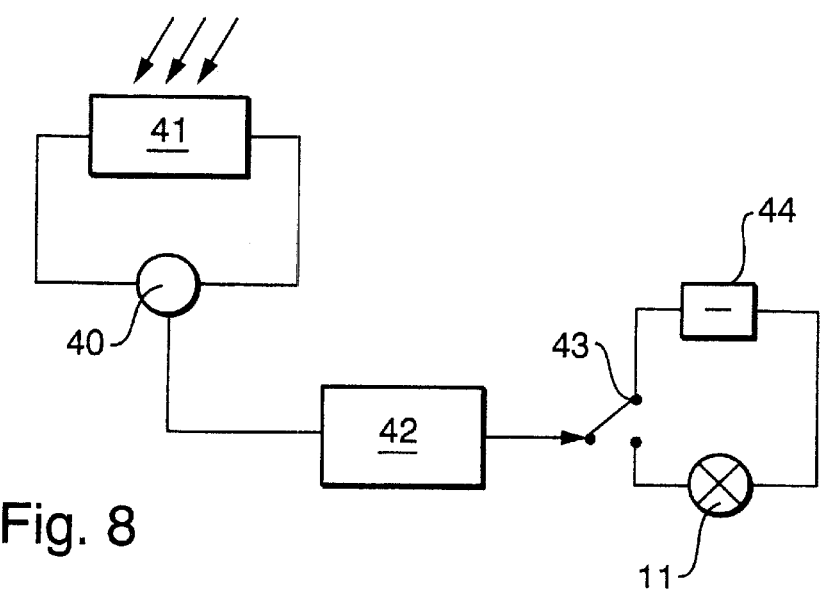
FIG. 8 shows a device for controlling the light source or light source.

FIG. 8 shows a device for controlling the light source or light sources 11. A measuring instrument 40 measures the electric current flowing through a light-sensitive element 41 or the voltage drop across light-sensitive element 41. Light-sensitive element 41 is preferably a phototransistor, a photodiode or a light-dependent ohmic resistor. A signal is relayed from measuring instrument 40 to a control device 42. A switch 43 is opened or closed as a function of the light intensity measured by light-sensitive element 41. When closed, switch 43 connects a voltage source 44 to a light source 11, so that fiber optic plate 6 is lighted. When switch 43 is opened, fiber optic plate 6 is not lighted, so that in this case, fiber optic plate 6 and thus the liquid crystal cell are lighted only by ambient light.

What is claimed is:

1. A display device having front lighting, comprising:
   a flat display;
   a fiber optic plate arranged on a side of the display facing an observer, the fiber optic plate having light-scattering particles incorporated therein, wherein light from a light source injected into the fiber optic plate is deflected at least partially in a direction of the display by the light-scattering particles; and
   a fiber optic wedge arranged on a side face of the fiber optic plate, the light of the light source being injected into a side face of the fiber optic wedge opposite an edge of the wedge is decoupled from the fiber optic wedge into the fiber optic plate.

2. The device according to claim 1, wherein the fiber optic plate is part of a front plate of a housing for the display.

3. The device according to claim 1, wherein the light source is at least one of a cold cathode fluorescent lamp, a light emitting diode, a glow lamp and an incandescent lamp.

4. The device according to claim 1, further comprising:
   a reflective surface, the light of the light source being injected into the fiber optic plate through the reflective surface.

5. The device according to claim 1, further comprising:
   a light-sensitive electric component arranged on the device, an ambient brightness being measured by the light-sensitive component, the display being lighted as a function of the ambient brightness.

6. The device according to claim 5, wherein the light-sensitive electric component includes one of a phototransistor, a photoresistor and a photodiode.

7. The device according to claim 1, further comprising:
   a base plate, the display being arranged on the base plate; and
   a reflector arranged on a side of the display facing the base plate.

8. The device according to claim 1, wherein the display is a liquid crystal display.

9. A display device having front lighting, comprising:
   a flat display; and
   a fiber optic plate arranged on a side of the display facing an observer, the fiber optic plate having light-scattering particles incorporated therein;
   wherein light from a light source injected into the fiber optic plate is deflected at least partially in a direction of the display by the light-scattering particles, and
   wherein an amount by volume of the light-scattering particles in the fiber optic plate amounts to a maximum of 2%, and the light-scattering particles are distributed uniformly over the volume of the fiber optic plate.

10. A display device having front lighting, comprising:
    a flat display; and
    a fiber optic plate arranged on a side of the display facing an observer, the fiber optic plate having light-scattering particles incorporated therein;
    wherein light from a light source injected into the fiber optic plate is deflected at least partially in a direction of the display by the light-scattering particles, and
    wherein a diameter of the light-scattering particles is in a range of 1 micrometer to 6 micrometers.

11. The device according to claim 10, wherein the fiber optic plate is part of a front plate of a housing for the display.

12. The device according to claim 10, wherein the light source is at least one of a cold cathode fluorescent lamp, a light emitting diode, a glow lamp and an incandescent lamp.

13. The device according to claim 10, further comprising:
    a reflective surface, the light of the light source being injected into the fiber optic plate through the reflective surface.

14. The device according to claim 10, further comprising:
    a fiber optic wedge arranged on a side face of the fiber optic plate, the light of the light source being injected into a side face of the fiber optic wedge opposite an edge of the wedge is decoupled from the fiber optic wedge into the fiber optic plate.

15. The device according to claim 10, further comprising:
    a light-sensitive electric component arranged on the device, an ambient brightness being measured by the light-sensitive component, the display being lighted as a function of the ambient brightness.

16. The device according to claim 15, wherein the light-sensitive electric component includes one of a phototransistor, a photoresistor and a photodiode.

17. The device according to claim 10, further comprising:

a base plate, the display being arranged on the base plate; and a reflector arranged on a side of the display facing the base plate.

18. The device according to claim 10, wherein the display is a liquid crystal display.

19. The device according to claim 10, wherein an amount by volume of the light-scattering particles in the fiber optic plate amounts to a maximum of 2%, and the light-scattering particles are distributed uniformly over the volume of the fiber optic plate.

20. The device according to claim 9, wherein the fiber optic plate is part of a front plate of a housing for the display.

21. The device according to claim 9, wherein the light source is at least one of a cold cathode fluorescent lamp, a light emitting diode, a glow lamp and an incandescent lamp.

22. The device according to claim 9, further comprising:

a reflective surface, the light of the light source being injected into the fiber optic plate through the reflective surface.

23. The device according to claim 9, further comprising:

a fiber optic wedge arranged on a side face of the fiber optic plate, the light of the light source being injected into a side face of the fiber optic wedge opposite an edge of the wedge is decoupled from the fiber optic wedge into the fiber optic plate.

24. The device according to claim 9, further comprising:

a light-sensitive electric component arranged on the device, an ambient brightness being measured by the light-sensitive component, the display being lighted as a function of the ambient brightness.

25. The device according to claim 24, wherein the light-sensitive electric component includes one of a phototransistor, a photoresistor and a photodiode.

26. The device according to claim 9, further comprising:

a base plate, the display being arranged on the base plate; and a reflector arranged on a side of the display facing the base plate.

27. The device according to claim 9, wherein the display is a liquid crystal display.

28. The device according to claim 9, wherein a diameter of the light-scattering particles is in a range of 1 micrometer to 6 micrometers.

* * * * *